May 31, 1927.

E. H. TARTRAIS 1,630,547

LUBRICATING ARRANGEMENT FOR THE CYLINDERS OF TWO-STROKE CYCLE ENGINES

Filed Jan. 14, 1926

Inventor
Eugène Henri Tartrais
by Olsrunn
his Attorney

May 31, 1927.  1,630,547
E. H. TARTRAIS
LUBRICATING ARRANGEMENT FOR THE CYLINDERS OF TWO-STROKE CYCLE ENGINES
Filed Jan. 14, 1926    2 Sheets-Sheet 2

Inventor
Eugène Henri Tartrais
by Ottinger
his Attorney

Patented May 31, 1927.

1,630,547

UNITED STATES PATENT OFFICE.

EUGÈNE HENRI TARTRAIS, OF MONTMORENCY, FRANCE.

LUBRICATING ARRANGEMENT FOR THE CYLINDERS OF TWO-STROKE CYCLE ENGINES.

Application filed January 14, 1926, Serial No. 81,143, and in France January 21, 1925.

My invention relates to a lubricating arrangement for the cylinders of internal combustion engines of the two-stroke type, and chiefly to heavy oil engines. The objects of the invention consist in lubricating the cylinder by an accurately regulated oil supply; in evenly distributing the oil upon the internal surface of the cylinder; in bringing the oil to a suitable point of the cylinder whereby the lubrication has the maximum efficiency and the loss of lubricant through the scavenging orifices is minimum; in preventing the oil for lubricating the cylinder from mixing with the oil for lubricating the crankcase which may be of a different kind, generally of a more fluid nature.

One feature of the said invention consists in admitting the lubricating oil, which is supplied by a pump with regulated feed, through apertures opening on the inner surface of the cylinder, and communicating with conduits of great length and relatively small cross section which are formed in the said cylinder and thus offer a relatively high resistance to the circulation of the oil, said apertures being narrow and deep in order that the oil may be retained therein to a certain degree by capillary action.

I further employ a suitable arrangement for utilizing the scavenging air to prevent the oil in the crankcase from mounting into the cylinder.

Further characteristics of the invention will be set forth in the following description with reference to the appended drawings which are given by way of example.

Figure 1:
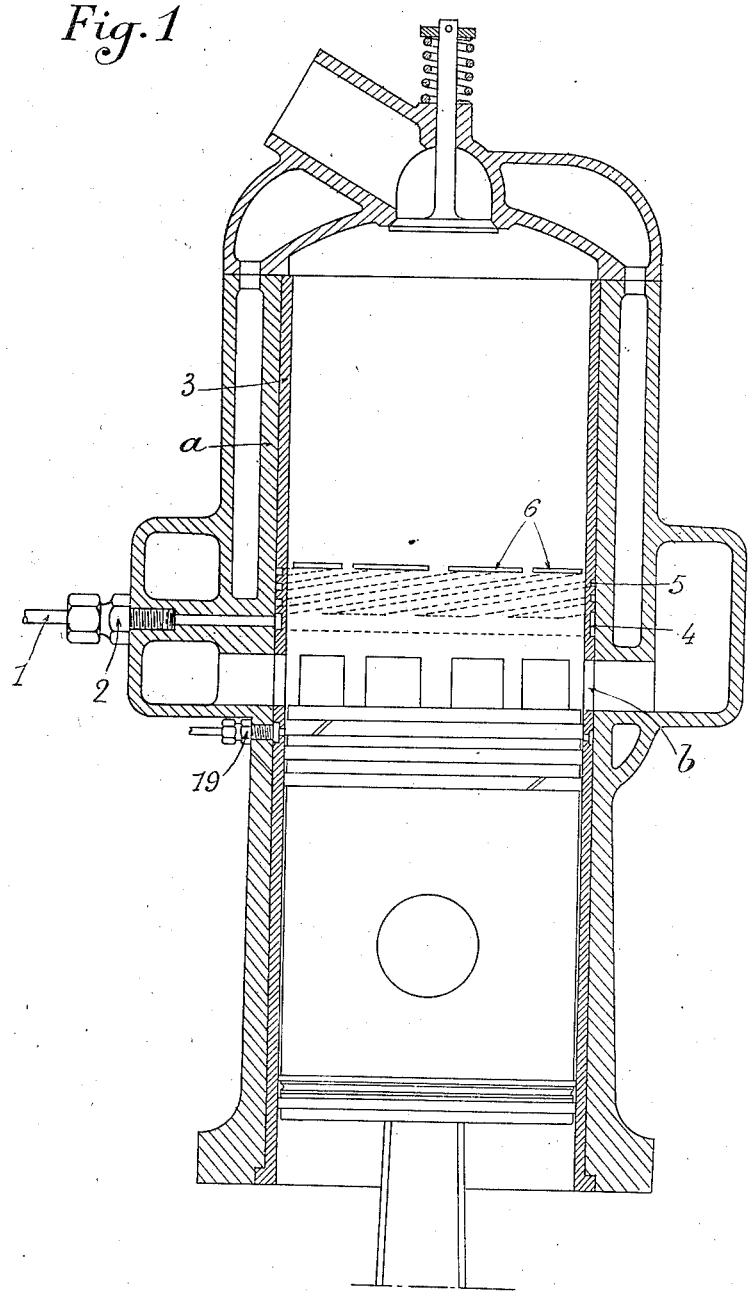
Fig. 1 is a cross section of a cylinder provided with my said lubricating arrangement.

Referring more particularly to Fig. 1 $a$ is the cylinder of the engine. The oil is withdrawn from a tank by a pump with regulated feed (not shown) which may be of any suitable type provided it is fluidtight at the pressure employed; the oil is circulated into the cylinder $a$ through the pipe 1 and the coupling member 2. The said cylinder comprises an internal sleeve 3 of a metal which is especially adapted to withstand the wear. On the outer surface of the said sleeve is formed an annular groove 4 constituting an oil collecting chamber and communicating with the coupling member 2, and with helical grooves 5 leading the oil from the groove 4 to the apertures 6 which open upon the inner surface of the cylinder. The said helical grooves form a set of conduits of great length which have no comunication with one another and have a relatively narrow cross section. They offer a relatively great resistance to the flow of oil so that the distribution of the oil around the surface of the cylinder shall be uniform in spite of the inclinations which the engine might assume. This resistance is chiefly due to the great length of the grooves or conduits 5, so that they may be given a sufficient cross section to obviate all risk of obstruction.

Figure 2:
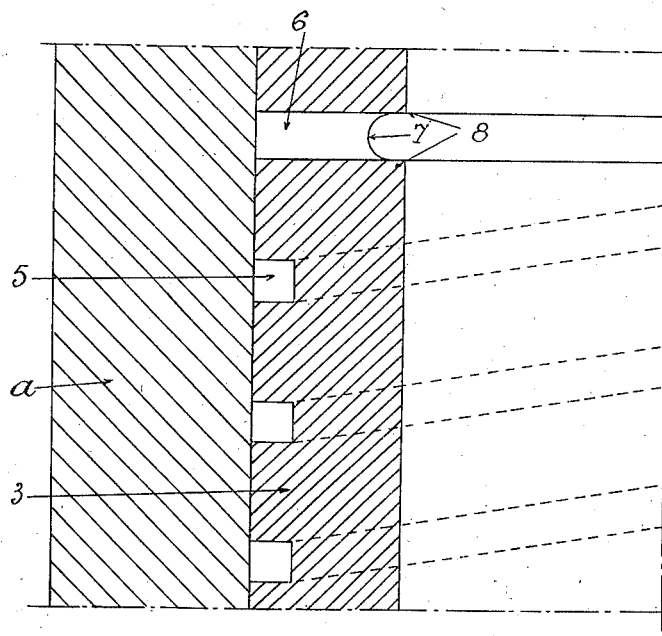
Fig. 2 is a view on a larger scale showing the entraining of the oil by the piston.

The feeding of the oil attaining the apertures 6 into the cylinder requires special precautions, and the said apertures are intentionally made long and narrow (Fig. 2), and the oil, supplied by the pump with the maximum regularity of feed and accumulating therein, shows a concave meniscus 7 directed towards the interior. The edges of the apertures 6 are slightly rounded or bevelled at 8, and when the piston passes before the said apertures, it will draw with it by capillary action a thin film of oil which is thus constantly renewed the regularity of its thickness being afforded by the retaining effect due to the capillary action of the said apertures.

The piston is supplied with oil only at its points of contact with the said sleeve, so that it will not be covered with oil upon its whole surface. At no point of the piston will there be an accumulation of oil, and this will diminish the direct entraining of the oil into the exhaust orifices.

In the present example, the apertures 6 are disposed above the inlet and exhaust ports $b$ of the cylinder, and experience shows that a better lubrication can be thus obtained. The oiling of the upper part of the cylinder—which requires the most attention—is more effective, and there will be less oil drawn into the exhaust. It may be objected that the oil will burn in the cylinder head, but it is precisely this action which should be sought for, so as to prevent the oil from proceeding into the exhaust, in which it would be distilled with formation of thick residues which would serve as a binding material for the carbon particles, whose formation cannot be entirely obviated at all speeds with heavy oil engines.

When the engine has not to operate at great inclinations, the apertures 6 may be replaced by a continuous groove which extends on the whole periphery of said sleeve.

Figure 3:
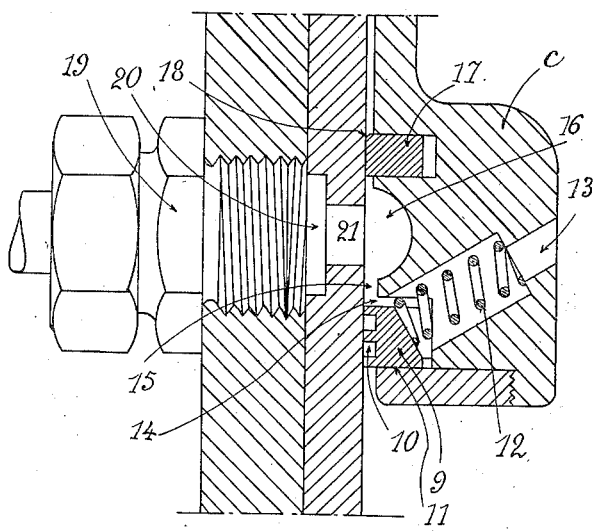
Fig. 3 shows the arrangement for preventing the oil in the crankcase from mounting into the cylinder, the piston being shown at the upper dead centre.

A further characteristic feature of the invention consists in providing suitable means whereby the oil in the crankcase will not be allowed to rise into the cylinder. In the device shown in Fig. 3, the lower end of the piston carries a scraping ring 9 which is grooved at 10 and is held against the surface of the cylinder and also against the lower supporting face 11 by the oblique springs 12, thus affording a certain clearance at the top of the ring at 14. At the end of the recesses for the springs are formed apertures 13 opening into the interior of the piston and hence in communication with the crankcase. Above the ring 9, the piston comprises a cylindrical part which is always separated from the cylinder by a narrow annular space 15. The piston has a groove of semi-circular cross-section 16 and carries the packing ring 17 which may have rounded edges 18. On the cylinder is mounted a coupling member 19 for the admission of air which opens into the groove 20 serving as a collecting chamber and communicating with the interior of the cylinder through the holes 21.

When the piston is at the upper dead centre (Fig. 3) the air, which is supplied from the scavenging air collector and admitted through the coupling member 19 will pass through the holes 21 into the groove 16, passes thence through the spaces 15 and 14 and the holes 13, and escapes into the crankcase, thus driving back any small quantity of oil which might have attained the piston external surface above the said scraping ring.

The supply of air to the holes 21 may optionally be regulated by a suitable feeding device such as a positively controlled poppet valve or a rotary slide valve.

Experience shows that my said method for keeping back the oil is most effective in preventing the oil from mounting into the cylinder.

If the oiling apertures 6 are situated below the exhaust or admission ports, a small amount of the oil for lubricating the cylinder might be driven into the crankcase. But this drawback, which is in all cases very slight, can only occur when the piston is oiled to excess, and this may be readily avoided.

Figure 4:
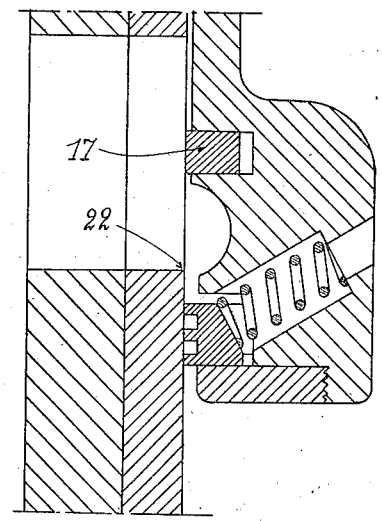
Fig. 4 is a modified form of the latter arrangement.

When the scavenging takes place through orifices in the lower part of the cylinder, the groove 20 and the holes 21 will be dispensed with (Fig. 4). The air is supplied from the scavenging air itself, and the leakage oil will be driven back into the crankcase as soon as the ring 17 comes above the edge 22, and this action will cease when the inverse movement takes place.

Obviously, the said invention is not limited to the details of construction hereinbefore described and represented, these being given solely by way of example.

Having now described my invention, what I claim as new and desire to secure by Letters Patent is:

1. In combination with a two stroke cycle engine having an inner sleeve, a lubricant inlet at the outer periphery of said cylinder, an annular groove at the outer periphery of said sleeve and communicating with said lubricant inlet, narrow and deep apertures provided in said sleeve, opening into the interior of said cylinder, and conduits of great length and relatively small cross section opening into said groove and into said apertures.

2. In the combination claimed in claim 1, the further feature residing in that said apertures are disposed along a circumference of said inner sleeve.

3. In the combination claimed in claim 1, the further feature residing in that said apertures form a circumferential slot in said inner sleeve.

4. In the combination claimed in claim 1, the further feature residing in that said apertures have rounded edges.

5. In combination with a two stroke cycle engine having an inner sleeve, a lubricant inlet at the outer periphery of said cylinder, an annular groove at the outer periphery of said sleeve and communicating with said lubricant inlet, narrow and deep apertures provided in said sleeve above the exhaust and admission ports, opening into the interior of said cylinder and having rounded edges, and helical conduits of great length and relatively small cross section opening into said groove and into said aperture.

6. A lubricating arrangement for the cylinders of two-stroke cycle engines comprising in combination: a lubricant inlet at the outer periphery of said cylinder, a narrow and deep recess provided in the inner wall of said cylinder, conduits of great length and relatively small cross section opening into said lubricant inlet and into said recess, a scraping ring mounted at the lower part of the piston of the engine, means affording the communication between the outer periphery of the piston above said scraping ring with the crankcase and a compressed air inlet provided in the wall of said cylinder and opening into the interior of said cylinder, whereby the compressed air will flow through said communicating means into the crankcase.

In testimony whereof I have signed my name to this specification.

EUGÈNE HENRI TARTRAIS.